United States Patent
Huang et al.

(10) Patent No.: US 8,837,738 B2
(45) Date of Patent: Sep. 16, 2014

(54) METHODS, SYSTEMS, AND APPARATUSES FOR OPTIMAL GROUP KEY MANAGEMENT FOR SECURE MULTICAST COMMUNICATION

(75) Inventors: Dijiang Huang, Chandler, AZ (US); Zhibin Zhou, Bellevue, WA (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 78 days.

(21) Appl. No.: 13/440,111

(22) Filed: Apr. 5, 2012

(65) Prior Publication Data

US 2012/0257756 A1     Oct. 11, 2012

Related U.S. Application Data

(60) Provisional application No. 61/473,491, filed on Apr. 8, 2011.

(51) Int. Cl.
   *H04L 9/08*     (2006.01)
(52) U.S. Cl.
   CPC .................................. *H04L 9/0836* (2013.01)
   USPC ....................................................... 380/281
(58) Field of Classification Search
   None
   See application file for complete search history.

(56) References Cited

U.S. PATENT DOCUMENTS 6,886,096 B2 * 4/2005 Appenzeller et al. ......... 713/170

FOREIGN PATENT DOCUMENTS

CN    101867472 A * 10/2010

OTHER PUBLICATIONS

"Cynature Networking and Consulting, Inc.," available at http://www.cncinc.net/.
"Eucalyptus," available at http://www.eucalyptus.com/.
"Identity 2.0," http://en.wikipedia.org/wiki/Identity 2.0.
"Minority graduate education at mountain states alliance (mcg@msa)," available at http://mati.eas.asu.edu:8421/MGE/brief.intro.html (2011).
"Opennebula," available at http://www.opennebula.org/.
"Shibboleth Project," available at http://www.shibboleth.net.
"Tcg specification architecture overview," available at https://www.trustedcomputinggroup.org (2007).
"VMware vSphere," available at http://www.vmware.com/products/vsphere/.
Ahn et al., "Managing privacy preferences for federated identity management," Proceedings of the 2005 workshop on Digital identity management, 28-36 (2005).

(Continued)

*Primary Examiner* — Philip Chea
*Assistant Examiner* — Fatoumata Traore
(74) *Attorney, Agent, or Firm* — Fulbright & Jaworski LLP

(57) ABSTRACT

Apparatuses, systems, and methods for optimal group key (OGK) management that may achieve non-colluding and/or the storage-communication optimality are disclosed. In some embodiments, a group controller (GC) is responsible for key generation and distribution and the group data are encrypted by a group key. When joining the group, in some embodiments, each group member (GM) is assigned a unique n-bit ID and a set of secrets, in which each bit is one-to-one mapped to a unique secret. Whenever GMs are revoked from the group, in some embodiments, the GC will multicast an encrypted key-update message. Only the remaining GMs may be able to recover the message and update GK as well as their private keys. The disclosed OGK scheme can achieve storage-communication optimality with constant message size and immune to collusion attack and also may outperform existing group key management schemes in terms of communication and storage efficiency.

9 Claims, 7 Drawing Sheets

(56) References Cited

OTHER PUBLICATIONS

Alrodhan et al., "A client-side CardSpace-Liberty integration architecture," Proceedings of the 7th symposium on Identity and trust on the Internet, 1-7 (2008).

Amazon, "Amazon elastic compute cloud," available at aws.amazon.com/ec2.

Anwer et al., "A Fast, Virtualized Data Plane for the NctFPGA," (2009).

Armbrust et al., "Above the clouds: A berkeley view of cloud computing," EECS Department, University of California, Berkeley, Tech. Rep. UCB/EECS-2009-28 (2009).

Balakrishnan et al., "TWOACK: preventing selfishness in mobile ad hoc networks," Wireless Communications and Networking Conference, 4 (2005).

Balan et al., "Tactics-based remote execution for mobile computing," ACM MobiSys (2003).

Barreto et al., "Efficient and provably-secure identity-based signatures and signcryption from bilinearmaps," Advances in Cryptology—ASIACRYPT 2005, 515-532 (2005).

Basagni et al., "A distance routing effect algorithm for mobility (DREAM)," Proceedings of the 4th annual ACM/IEEE international conference on Mobile computing and networking, 76-84 (1998).

Bethencourt et al., "Ciphertext-Policy Attribute-Based Encryption," Proceedings of the 28th IEEE Symposium on Security and Privacy (Oakland) (2007).

Bhargav-Spantzel et al., "User centricity: a taxonomy and open issues," Journal of Computer Security, 15(5): 493-527 (2007).

Boneh et al., "A fully collusion resistant broadcast, trace, and revoke system," Proceedings of the 13th ACM conference on Computer and communications security, :211-220 (2006).

Boneh et al., "Collusion Resistant Broadcast Encryption with Short Ciphertexts and Private Keys," Advances in Cryptology—Crypto 2005: 25th Annual International Cryptology Conference, Santa Barbara, California, USA (2005).

Boneh et al., "Conjunctive, subset, and range queries on encrypted data," Proceedings of the 4th conference on Theory of cryptography, 535-554 (2007).

Boneh et al., "Fully collusion resistant traitor tracing with short ciphertexts and private keys," Advances in Cryptology—EUROCRYPT 2006, :573-592 (2006).

Boneh et al., "Hierarchical identity based encryption with constant size ciphertext," Advances in Cryptology—EUROCRYPT 2005, 440-456 (2005).

Boneh et al., "Identity-based encryption from the weil pairing," SIAM J. of Computing, 3: 586-615 (2003).

Bowers et al., "Proofs of retrievability: Theory and implementation," Proceedings of the ACM workshop on Cloud computing security (2009).

Camp et al., "Location information services in mobile ad hoc networks," IEEE International Conference on Communications, 5 (2002).

Canetti et al., "Efficient Communication-Storage Tradeoffs for Multicast Encryption," Advances in Cryptology—Eurocrypt; 99, 1592:459-474 (1999).

Canetti et al., "Multicast security: a taxonomy and some efficient constructions," INFOCOM'99. Eighteenth Annual Joint Conference of the IEEE Computer and Communications Societies. Proceedings. IEEE, 2 (1999).

Caronni et al., "Efficient security for large and dynamic multicast groups," Proceedings of the IEEE 7th International Workshop on Enabling Technologies: Infrastructure for Collaborative Enterprises (WET ICE; 98) (1998).

Chang et al., "Key management for secure Internet multicast using Boolean function minimization techniques," INFOCOM'99. Eighteenth Annual Joint Conference of the IEEE Computer and Communications Societies, 2 (1999).

Chase et al., "Multi-authority Attribute Based Encryption," Lecture Notes in Computer Science, 4392: 515-534 (2007).

Chase et al., "Patient Controlled Encryption: patient privacy in electronic medical records," Proceedings of the ACM workshop on Cloud computing security (2009).

Cheung et al., "Collusion-Resistant Group Key Management Using Attribute-Based Encryption," Technical report, Cryptology ePrint Archive Report 2007/161 (2007). http://eprint.iacr.org.

Cheung et al., "Provably secure ciphertext policy abe," Proceedings of the 14th ACM conference on Computer and communications security, 456-465 (2007).

Chong et al., "Multi-Tenant Data Architecture," Microsoft MSDN Document, available at http://msdn.microsoft.com/en-us/library/aa479086.aspx (2006).

Chow et al., "Controlling data in the cloud: outsourcing computation without outsourcing control," Proceedings of the ACM workshop on Cloud computing security, 85-90 (2009).

Christodorescu et al., "Cloud security is not (just) virtualization security: a short paper," Proceedings of the ACM workshop on Cloud computing security, 97-102 (2009).

Chun et al., "Augmented Smartphone Applications Through Clone Cloud Execution," Proceedings of USENIX HotOS XII (2009).

Covington et al., "A packet generator on the netfpga platform," IEEE Symposium on Field-Programmable Custom Computing Machines (FCCM) (2009).

Delerablee et al., "Fully collusion secure dynamic broadcast encryption with constant-size ciphertexts or decryption keys," Pairing-Based Cryptography, 39-59 (2007).

Desmond NG et al., "Dynamic Balanced Key Tree Management for Secure Multicast Communications," IEEE Transactions on Computers, 56(5):590-605 (2007).

Dey et al., "Towards a better understanding of context and context-awareness," Proceedings of the workshop on the what, who, where, and how of context-awareness, 304-307 (2000).

Di Vimercati et al., "Over-encryption: management of access control evolution on outsourced data," Proceedings of the 33rd international conference on Very large data bases, 123-134 (2007).

Ding et al., "A static-node assisted adaptive routing protocol in vehicular networks," Proceedings of the fourth ACM international workshop on Vehicular ad hoc networks, 59-68 (2007).

Dondeti et al., "Scalable secure one-to-many group communication using dual encryption," Computer Communications, 23(17):1681-1701 (2000).

Ducamp et al., "Linux's Security Capabilities," available at http://www.hsc.fr/ressources/presentations/linux2000/linux2000.htm.en (2000).

Emura et al., "A ciphertext-policy attribute-based encryption scheme with constant ciphertext length," Proceedings of the 5th International Conference on Information Security Practice and Experience, 13-23 (2009).

Enterprise, "Department of Defense Global Information Grid Architectural Vision," (2007).

Ericksson et al., "Truelink: A practical countermeasure to the wormhole attack in wireless networks," Proceedings of the 14th IEEE International Conference on Network Protocols, 75-84 (2000).

Fan et al., "Group key management with collusion-scalability tradeoffs using a hybrid structuring of receivers," Proceedings of the IEEE International Conference on Computer Communications Networks (2002).

Fiat et al., "Broadcast Encryption," Advances in Cryptology—Crypto; 93. Lecture Notes in Computer Science, 773:480-491 (1994).

Gafni et al., "Efficient methods for integrating traceability and broadcast encryption," Lecture Notes in Computer Science, :372-387 (1999).

Garay et al., "Long-lived broadcast encryption," Lecture Notes in Computer Science, :333-352 (2000).

Goodrich et al., "Efficient tree-based revocation in groups of low-state devices," Lecture Notes in Computer Science, :511-527 (2004).

Goyal et al., "Attribute-based encryption for fine-grained access control of encrypted data," Proceedings of the 13th ACM conference on Computer and communications security, 89-98 (2006).

(56) References Cited

OTHER PUBLICATIONS

Goyal, "A lightweight secure cyber foraging infrastructure for resource-constrained devices," in Proceedings of the 6th IEEE Workshop on Mobile Computing Systems and Applications, 186-195 (2004).

Halevy et al., "The LSD broadcast encryption scheme," Lecture Notes in Computer Science, :47-60 (2002).

Harney et al., "Group key management protocol (GKMP) architecture," Technical report, RFC 2094 (1997).

Harney et al., "Group key management protocol (GKMP) specification," Technical report (1997).

Hodges et al., "Glossary for the OASIS Security Assertion Markup Language (SAML) V2.0," OASIS SSTC (Mar. 2005).

Hong et al., "Sat: Building new trust architecture for vehicular networks," Proceedings of the 3rd ACM International Workshop on Mobility in the Evolving Internet Architecture (MobiArch) (2008).

Hsu et al., "Secure File System Services for Web 2.0 Applications," Proceedings of the 2009 ACM workshop on Cloud computing security (2009).

Hu et al., "Ariadne: A Secure On-Demand Routing Protocol for Ad Hoc Networks," Wireless Networks, 11(1): 21-38 (2005).

Hu et al., "Packet Leashes: A Defense against Wormhole Attacks in Wireless Ad Hoc Networks," Proceedings of IEEE Computer and Communications Societies (INFOCOM), 1976-1986 (2003).

Hu et al., "Rushing Attacks and Defense in Wireless Ad Hoc Network Routing Protocols," Proceedings of ACM Workshop on Wireless Security (WiSe), 30-40 (2003).

Hu et al., "SEAD: secure efficient distance vector routing for mobile wireless ad hoc networks," Ad Hoc Networks, 1(1): 175-192 (2003).

Huang et al., "On Providing Confidentiality for Link State Network Routing Protocol.".

Huang et al., "Secure Link State Routing Protocol: A Framework for Network Survivability.".

Huang et al., "Strategies for Addressing Link State Routing Protocol Vulnerabilities: A Panoramic View.".

Huang et al., "A Byzantine Resilient Multi-path Key Establishment Scheme and Its Robustness Analysis for Sensor Networks," Proceedings of 5th IEEE International Workshop on Algorithms for Wireless, Mobile, Ad Hoc and Sensor Networks, 240b (2005).

Huang et al., "A double authentication scheme to detect impersonation attack in link state routing protocols," Proceedings of IEEE International Conference on Communications (ICC), 1723-1727 (2003).

Huang et al., "A Key-chain Based Keying Scheme for Many-to-Many Secure Group Communication," ACM Transactions on Information and System Security, 7(4): 523-552 (2004).

Huang et al., "A Secure Group Key Management Scheme for Hierarchical Mobile Ad-hoc Networks," Ad Hoc Networks, 6(4): 560-577 (2008).

Huang et al., "An Information Theoretic Approach for MANET Unlinkability Measure (ICME)," Proceedings of the Fourth International Conference on Mobile Computing and Ubiquitous Networking (2008).

Huang et al., "ASPE: attribute-based secure policy enforcement in vehicular ad hoc networks," Ad Hoc Networks (2009).

Huang et al., "Establishing email-based social network trust for vehicular networks," Proceedings of IEEE CCNC, Special Session on Social Networking (2010).

Huang et al., "Gradual Identity Exposure Using Attribute-Based Encryption," Proceedings of the Second IEEE International Conference on Information Privacy, Security, Risk and Trust (2010).

Huang et al., "Location-aware Key Management Scheme for Wireless Sensor Networks," Proceedings of ACM Workshop on Security of Ad Hoc and Sensor Networks (SASN), 29-42 (2004).

Huang et al., "Low-latency mix using split and merge operations," The third special issue on Security and Management, Springer Journal of Network and Systems Management (2010).

Huang et al., "Mobicloud: A secure mobile cloud framework for pervasive mobile computing and communication," in Proceedings of 5th IEEE International Symposium on Service-Oriented System Engineering (2010).

Huang et al., "Modeling Pairwise Key Establishment for Random Key Predistribution in Large-scale Sensor Networks," IEEE/ACM Transactions on Networking, 15: 1204-1215 (2007).

Huang et al., "New Architecture for Intra-Domain Network Security," Communications of the ACM, 49(11): 64-72 (2006).

Huang et al., "On Providing Confidentiality in Link State Routing Protocol," Proceedings of IEEE Consumer Communications and Networking Conference, 671-675 (2006).

Huang et al., "Secure Data Processing Framework for Mobile Cloud Computing," IEEE Infocom Workshop on Cloud Computing, 620-624 (2011).

Huang et al., "Secure Pairwise Key Establishment in Large-scale Sensor Networks: an Area Partitioning and Multi-group Key Predistribution Approach," ACM Transactions on Sensor Networks, 3(16) (2007).

Huang et al., "Source Routing Based Pairwise Key Establishment Protocol for Sensor Networks," Proceedings of 24th IEEE International Performance Computing and Communications Conference, 177-183 (2005).

Huang et al., "Towards lightweight secure communication protocols for passive RFIDs," the 6th IEEE Communications Society Conference on Sensor, Mesh and Ad Hoc Communications and Networks (SECON) (2009).

Huang et al., "Trust Analysis of Link State Network Routing," Proceedings of 2nd International Workshop on Trust Internet (TIW) (2003).

Huang, "A Pseudonym-Based Cryptography for Anonymous Communications in Mobile Ad-hoc Networks," Special Issue on Cryptography in Networks, International Journal of Security and Networks (IJSN), 2(3-4): 272-283 (2007).

Huang, "An Identity-Based Blind Key Generation and Signature Scheme," Proceedings of Conference on Information Security and Cryptology (CISC), 65-73 (2005).

Huang, "On an Information Theoretic Approach to Model Anonymous MANET Communications," Proceedings of the IEEE International Symposium on Information Theory (ISIT), 1629-1633 (2009).

Huang, "On Measuring Anonymity for Wireless Mobile Ad-hoc Networks," Proceedings of 2nd IEEE International Workshop on Performance and Management of Wireless and Mobile Networks (P2MNet), 779-786 (2006).

Huang, "Traffic Analysis-based Unlinkability Measure for IEEE 802.11b-based Communication Systems," Proceedings of ACM Workshop on Wireless Security (WiSe), 65-74 (2006).

Huang, "Unlinkability Measure for IEEE 802.11 Based MANETs," IEEE Transactions on Wireless Communications, 7(3): 1025-1034 (2008).

Huang, "Using Delaunay Triangulation to Construct Obstacle Detour Mobility Model," Proceedings of IEEE Wireless Communications and Networking Conference (WCNC), 1644-1649 (2005).

Huang, Wireless and Sensor Networks Security, Nova Science Publishers, Inc., ch. Secure Multi-path Data Delivery in Wireless Sensor Networks (2008).

Hunt et al., "The coign automatic distributed partitioning system," Proceedings of USENIX Symposium on Operating Systems Design and Implementation (OSDI) (1999).

IETF PIIX Working Group, "Public-key infrastructure (x.509) (pkix)," available at http://www.ietf.org/html.charters/pkix-charter.html, Internet RFCs.

Jain et al., "Geographical routing using partial information for wireless ad hoc networks," Personal Communications, IEEE, 8(1): 48-57 (2001).

Johnson et al., "The dynamic source routing protocol (dsr) for mobile ad hoc networks for ipv4," IETF RFC4728 (2007).

Josang et al., "User centric identity management," AusCERT Asia Pacific Information Technology Security Conference (2005).

Juang et al., "Energy-efficient computing for wildlife tracking: design tradeoffs and early experiences with ZebraNet," ACM SIGPLAN Notices, 37(10): 96-107 (2002).

(56) References Cited

OTHER PUBLICATIONS

Julien, "Context-Aware Middleware Abstractions for Ad Hoc Mobile Computing," URL: http://www.cse.wustl.edu/mobilab/pubs/proposal.pdf (2003).
Kandiah et al., "C-Mix: A lightweight Anonymous Routing Approach," Proceedings of Information Hiding (2008).
Kandiah et al., "Re-distribution of Traffic Flow in Mix Networks—Split Mix," Arizona State University, available at http://snac.eas.asu.edu/snac/document/split.pdf (2008).
Kannhavong et al., "A study of a routing attack in OLSR-based mobile ad hoc networks," International Journal of Communication Systems, 20(11): 1245-1261 (2007).
Kapoor et al., "Secret-sharing based secure communication protocols for passive rfids," Proceedings of IEEE Globecom, CISS, 1-9 (2009).
Karp et al., "GPSR: Greedy Perimeters Stateless Routing for Wireless Network," Proceedings of ACM/IEEE Mobicom, 243-254 (2000).
Katz et al., "Predicate encryption supporting disjunctions, polynomial equations, and inner products," Proceedings of the theory and applications of cryptographic techniques 27th annual international conference on Advances in cryptology, 146-162 (2008).
Ko et al., "Location-Aided Routing (LAR) in mobile ad hoc networks," Wireless Networks, 6(4): 307-321 (2000).
Korkmaz et al., "Urban mutli-hop broadcast protocol for inter-vehicle communication systems," Proceedings of the 1st ACM international workshop on Vehicular ad hoc networks, 76-85 (2004).
Kurosawa et al., "Detecting Blackhole Attack on AODV-Based Mobile Ad Hoc Networks by Dynamic Learning Method," IEIC Technical Report, 105(627): 65-68 (2006).
Lam et al., "TrackBack Spam: Abuse and Prevention," Proceedings of the ACM workshop on Cloud computing security (2009).
Lamport et al., "The Byzantine Generals Problem," ACM Transactions on Programming Languages and Systems, 4(3): 382-401 (1982).
Li et al., "A scalable location service for geographic ad hoc routing," Proceedings of the 6th annual international conference on Mobile computing and networking, 120-130 (2000).
Li et al., "Attribute-Based Ring Signatures," IACR ePrint (2008).
Li et al., "Batch rekeying for secure group communications," Proceedings of the 10th international conference on World Wide Web, : 525-534 (2001).
Li et al., "Deploying Mobile Computation in Cloud Service," Proceedings of the First International Conference for Cloud Computing (CloudCom) (2009).
Liang et al., "On Economic Mobile Cloud Computing Model," Lecture Notes of the Institute for Computer Sciences, Social Informatics and Telecommunications Engineering, 76: 329-341 (2012).
Liu et al., "Efficient self-healing group key distribution with revocation capability," Proceedings of the 10th ACM conference on Computer and communications security, :231-240 (2003).
Liu et al., "Enhanced Reputation Mechanism for Mobile Ad Hoc Networks," Lecture Notes in Computer Science, 48-62 (2004).
Lockwood et al., "Net FPGA—an open platform for gigabit-rate network switching and routing," IEEE International Conference on Microelectronic Systems Education (2007).
Lynn, On the implementation of pairing-based cryptosystems. PhD thesis, Stanford University, http://crypto.stanford.edu/pbc/thesis.pdf (2007).
Lyons et al., "Context-aware composition," Proceedings of the 10th workshop on Mobile Computing Systems and Applications, 12 (2009).
Lyons et al., "Multi-display Composition: Supporting Display Sharing for Collocated Mobile Devices," Proceedings of the 12th IFIP TC 13 International Conference on Human-Computer Interaction: Part I (2009).
Maihofer et al., "Abiding geocast: time-stable geocast for ad hoc networks," Proceedings of the 2nd ACM international workshop on Vehicular ad hoc networks, 20-29 (2005).

Malakooti et al., "Multiple Criteria Network Routing with Simulation Results," Proc. 15th Industrial Engineering Research Conference (IERC) (2006).
Marti et al., "Mitigating Routing Misbehavior in Mobile Ad Hoc Networks," Proceedings of the 6th annual international conference on Mobile computing and networking, 255-265 (2000).
Mascolo et al., "SCAR: context-aware adaptive routing in delay tolerant mobile sensor networks," Proceedings of the 2006 international conference on Wireless communications and mobile computing, ACM 538 (2006).
McCluskey, "Minimization of Boolean functions," Bell System Technical Journal, 35(5): 1417-1444 (1956).
McGrew et al., "Key establishment in large dynamic groups using one-way function trees," Manuscript submitted to IEEE Transactions on Software Engineering. A full version of the paper appears in http://download.nai.com/products/media/nai/misc/oft052098.ps (1998).
Medhi et al., "Secure and Resilient Routing: A Framework for Resilient Network Architectures," Information Assurance: Dependability and Security in Network Systems, Morgan Kaufmann Publishers (2007).
Merrels, "DIX: Digital Identity Exchange Protocol," Internet Draft (Mar. 2006).
Messer et al., "Towards a distributed platform for resource-constrained devices," International Conference on Distributed Computing Systems, 22: 43-51 (2002).
Mittra et al., "A framework for scalable secure multicasting," ACM SIGCOMM Computer Communication Review, 27(4):277-288 (1997).
Miyaji et al., "New explicit conditions of elliptic curve traces for FR-reduction," IEICE Transactions on Fundamentals of Electronics, Communications and Computer Sciences, 84(5):1234-1243 (2001).
Moyer et al., "A survey of security issues in multicast communications," Network, IEEE, 13(6)12-23 (1999).
Musolesi et al., "CAR: Context-Aware Adaptive Routing for Delay-Tolerant Mobile Networks," IEEE Transactions on Mobile Computing, 8(2): 246-260 (2009).
Mutaf, "Pocket Bluff: A cooperation enforcing scheduled pocket switching protocol," Institut National de Recherche en Informatique et en Automatique, Technical Report No. 5664 (2005).
Naor et al., "Efficient trace and revoke schemes," Financial cryptography: 4th international conference, FC 2000, Anguilla, British West Indies, Feb. 20-24, 2000: proceedings, pp. 1, 2001. Springer Verlag.
Naor et al., "Revocation and tracing schemes for stateless receivers," Lecture Notes in Computer Science, 41-62 (2001).
Ni et al., "Determination of optimal call admission control policy in wireless networks," IEEE Transactions on Wireless Communications, 8(2): 1038-1044 (2009).
Ning et al., "How to misuse AODV: a case study of insider attacks against mobile ad-hoc routing protocols," Ad Hoc Networks, 3(6): 795-819 (2005).
Oasis Working Draft, "An introduction to XRIs" (2005).
Oberheide, "Virtualized in-cloud security services for mobile devices," in Proceedings of the First Workshop on Virtualization in Mobile Computing, 31-35 (2008).
Ostrovsky et al., "Attribute-based encryption with non-monotonic access structures," Proceedings of the 14th ACM conference on Computer and communications security, 195-203 (2007).
Papadimitratos et al., "Secure Routing for Mobile ad hoc Networks," SCS Communication Networks and Distributed Systems Modeling and Simulation Conference (CNDS), 1-27 (2002).
Pering et al., "Enabling pervasive collaboration with platform composition," Pervasive Computing, 184-201 (2009).
Perkins et al., "Ad Hoc on Demand Distance Vector (AODV) Routing," IETF RFC3561 (2003).
Perrig et al., "A New Protocol for Efficient Large-Group Key Distribution," IEEE Symposium on Security and Privacy, 247-262 (2001).
Pirretti et al., "Secure attribute-based systems," Proceedings of the 13th ACM conference on Computer and communications security, 99-112 (2006).

(56) References Cited

OTHER PUBLICATIONS

Poovendran et al., "An information-theoretic approach for design and analysis of rooted-tree-based multicast key management schemes," IEEE Transactions on Information Theory, 47(7): 2824-2834, (2001).
Qin et al., "A Statistical Traffic Pattern Discovery System for MANETs," MILCOM (2009).
Qin et al., "OLAR: On-demand Lightweight Anonymous Routing in MANETs," The Fourth International Conference on Mobile Computing and Ubiquitous Networking (ICMU) (2008).
Qin et al., "VehiCloud: Cloud Computing Facilitating Routing in Vehicular Networks," Infocom (2011).
Rafaeli et al., "A survey of key management for secure group communication," ACM Computing Surveys (CSUR), 35(5):309-329 (2003).
Raj et al., "Resource management for isolation enhanced cloud services," Proceedings of the 2009 ACM workshop on Cloud computing security, 97-102 (2009).
Ramachandran et al., "Computing Cryptographic Algorithms in Portable and Embedded Devices," Portable Information Devices, 2007. PORTABLE07. IEEE International Conference on, 25-29:1-7 (2007).
Ramjee et al., "On optimal call admission control in cellular networks," Wireless Networks, 3(1): 29-41 (1997).
Raykova et al., "Secure Anonymous Database Search," Proceedings of the ACM workshop on Cloud computing security (2009).
Recordon et al., "OpenID 2.0: a platform for user-centric identity management," Proceedings of the second ACM workshop on Digital identity management, 16 (2006).
Refaei et al., "A Reputation-based Mechanism for Isolating Selfish Nodes in Ad Hoc Networks," Proceedings of the IEEE Annual International Conference on Mobile and Ubiquitous Systems: Networking and Services (MOBIQUITOUS) (2005).
Ristenpart et al., "Hey, You, Get Off of My Cloud: Exploring Information Leakage in Third-Party Compute Clouds," ACM Conference on Computer and Communications Security (2009).
Riva et al., "Context-aware migratory services in ad hoc networks," IEEE Transactions on Mobile Computing, 1313-1328 (2007).
Safavi-Naini et al., "New constructions for multicast re-keying schemes using perfect hash families," Proceedings of the 7th ACM conference on Computer and communications security, pp. 228-234. ACM New York, NY, USA (2000).
Sahai et al., "Fuzzy Identity-Based Encryption," Advances in Cryptology—Eurocrypt, 3494: 457-473, Springer (2004).
Sandhu et al., "Role-based access control models," Computer, 29(2): 38-47 (1996).
Santos et al., "Towards trusted cloud computing," Proceedings of USENIX HotCloud (2009).
Sanzgiri et al., "A secure routing protocol for ad hoc networks," Proceedings of the 10th IEEE International Conference on Network Protocols, 78-87 (2002).
Sasao et al., "Bounds on the average number of products in the minimum sum-of-products expressions for multiple-value input two-valued output functions," IEEE Transactions on Computers, 40(5): 645-651 (1991).
Secure Networking and Computing Research Group (SNAC), "MobiCloud," available at http://mobicloud.asu.edu (2010).
Shamir et al., "How to Share a Secret," Communications of the ACM, 22(11): 612-613 (1979).
Sherman et al., "Key Establishment in Large Dynamic Groups Using One-Way Function Trees," IEEE Transactions on Software Engineering, :444-458, 2003.
Snoeyink et al., "A lower bound for multicast key distribution," Computer Networks, 47(3):429-441 (2005).
Sobey et al., "Browser Interfaces and Extended Validation SSL Certificates: An Empirical Study," Proceedings of the ACM workshop on Cloud computing security (2009).
Su et al., "Haggle: Clean-slate networking for mobile devices," Technical Report, UCAM-CL-TR-680, University of Cambridge (2006).
Sun et al., "Information theoretic framework of trust modeling and evaluation for ad hoc networks," IEEE Journal on Selected Areas in Communications, 24(2): 305-317 (2006).
Tseng et al., "A Specification-Based Intrusion Detection Model for OLSR," Lecture Notes in Computer Science, 3858: 300 (2006).
Verma et al., "Pseudo-IDM: an Anonymous Solution for Identity Management," Arizona State University, available at http://snac.eas.asu.edu/snac/document/pseudonym.pdf (2008).
Wallner et al., "Key Management for Multicast: Issues and Architectures RFC 2627," IETF (1999).
Wang et al., "An effective intrusion detection approach for OLSR MANET protocol," 1st IEEE ICNP Workshop on Secure Network Protocols, 55-60 (2005).
Wang et al., "Secure and efficient access to outsourced data," Proceedings of the ACM workshop on Cloud computing security, 55-66 (2009).
Want et al., "Dynamic composable computing," Proceedings of the 9th workshop on Mobile computing systems and applications, 17-21 (2008).
Waters, "Ciphertext-policy attribute-based encryption: An expressive, efficient, and provably secure realization," ePrint report, 290 (2008).
Wei et al., "Managing security of virtual machine images in a cloud environment," Proceedings of the ACM workshop on Cloud computing security, 91-96 (2009).
Wenning et al., "A Generic Framework for Context-Aware Routing and its Implementation in Wireless Sensor Networks," ITG-Fachbericht-Mobilkommunikcation-Technologien und Anwendungen (2009).
Williams et al., "A Group Force Mobility Model," Proceedings of 29th Annual Simulation Symposium, 333-340 (2006).
Williams et al., "Group force mobility model and its obstacle avoidance capability," Journal of the International Academic of Astronautics, Acta Astronautica, 65(7-8): 949-957 (2009).
Williams et al., "Group Force Mobility Models and Their Obstacle Avoidance Capability," Proceedings of the 57th International Astronautically Congress (2006).
Wong et al., "Secure group communications using key graphs," IEEE/ACM Transactions on Networking, 8(1):16-30 (2000).
Wu et al., "MDDV: a mobility-centric data dissemination algorithm for vehicular networks," Proceedings of the 1st ACM international workshop on Vehicular ad hoc networks, 47-56 (2004).
Wyse, "Applying Location-Aware Linkcell-Based Data Management to Context-Aware Mobile Business Services," International Conference on the Management of Mobile Business (ICMB) (2007).
Yadumurthy et al., "Reliable MAC broadcast protocol in directional and omni-directional transmissions for vehicular ad hoc networks," Proceedings of the 2nd ACM international workshop on Vehicular ad hoc networks, 10-19 (2005).
Yang et al., "Reliable group rekeying: a performance analysis," Proceedings of the 2001 conference on Applications, technologies, architectures, and protocols for computer communications, 27-38 (2001).
Yun et al., "On protecting integrity and confidentiality of cryptographic file system for outsourced storage," Proceedings of the ACM workshop on Cloud computing security, 67-76 (2009).
Zapata et al., "Securing ad hoc routing protocols," Proceedings of the 3rd ACM workshop on Wireless security, 1-10 (2002).
Zhang et al., "Securing elastic applications on mobile devices for cloud computing," in Proceedings of the 2009 ACM workshop on Cloud computing security, 127-134 (2009).
Zhao et al., "A message ferrying approach for data delivery in sparse mobile ad hoc networks," Proceedings of the 5th ACM international symposium on Mobile ad hoc networking and computing, 187-198 (2004).
Zhao et al., "VADD: Vehicle-assisted data delivery in vehicular ad hoc networks," IEEE Transactions on Vehicular Technology, 57(3): 1910-1922 (2008).
Zhou et al., "An optimal key distribution scheme for multicast group communication," IEEE Conference on Computer Communications (Infocom) (2010).
Zhou et al., "Constructing Efficient Attribute-Based Broadcast Encryption," IEEE Infocom 2010.

(56) References Cited

OTHER PUBLICATIONS

Zhou et al., "Efficient Privacy-Preserving Ciphertext-Policy Attribute Based Encryption and Broadcast Encryption," AsiaCCS (2011).

Zhou et al., "Enforcing User-Controlled Secure Data Sharing for Public Cloud Data Services," Arizona State University.

Zhou et al., "On Efficient Ciphertext—Policy Attribute Based Encryption and Broadcast Encryption," 17th ACM Conference on Computer and Communications Security (2010).

Zou et al., "A Practical and Flexible Key Management Mechanism for Trusted Collaborative Computing," INFOCOM 2008, 27th Conference on Computer Communications, 538-546 (2008).

\* cited by examiner

METHODS, SYSTEMS, AND APPARATUSES FOR OPTIMAL GROUP KEY MANAGEMENT FOR SECURE MULTICAST COMMUNICATION

STATEMENT REGARDING FEDERALLY SPONSORED RESEARCH OR DEVELOPMENT

This invention was made with Government support under grant No. N00014-10-1-0714 from the Office of Naval Research Young Investigator Program (ONR YIP). The Government has certain rights in the invention.

CROSS-REFERENCE TO RELATED APPLICATIONS

This application claims priority to U.S. Provisional Application No. 61/473,491 filed Apr. 8, 2011, entitled "Methods, Systems, and Apparatuses for Optimal Group Key Management for Secure Multicast Communication," the entire contents of which are incorporated herein by reference without disclaimer.

This application is also related to U.S. patent application Ser. No. 13/440,201, filed Apr. 5, 2012, entitled "Systems and Apparatuses for a Secure Mobile Cloud Framework for Mobile Computing and Communication," which claims priority to U.S. Provisional Application No. 61/473,477 filed Apr. 8, 2011, and is also related to U.S. Provisional Application No. 61/620,694, filed Apr. 5, 2012, entitled "Systems and Apparatuses for a Secure Mobile Cloud Framework for Mobile Computing and Communication." The entire contents of each of the above-referenced U.S. patent applications are incorporated herein by reference without disclaimer.

BACKGROUND OF THE INVENTION

1. Field of the Invention

This invention relates to the multicast transmission and more particularly relates to methods and systems for optimal group key management for secure multicast communication. An Optimal Group Keying (OGK) scheme is disclosed that achieves both the non-colluding and storage-communication optimality. In the disclosed OGK, a group controller (GC) is responsible for key generation and distribution to group members (GM) and the group data are encrypted by a group key (GK).

2. Description of the Related Art

IP multicast is used to distribute data to a group of receivers efficiently. The efficiency can be achieved because a datagram is transmitted once at the source and any packet forwarding link in the network, saving the cost of the sender as well as network bandwidth.

Multicast group key distribution schemes have been proposed to secure one-to-many group data distribution using IP multicast. Existing solutions restrict the group memberships by encrypting the data using a symmetric Group Key (GK). One of critical requirements of secure group communication is to ensure only legitimated group members to have the update-to-date GKs when group members join or leave the group dynamically. This requirement is usually achieved through a group rekeying procedure, in which a centralized group controller updates the GKs for all legitimate group members.

Group membership revocation is usually a more difficult situation than group membership addition due to the fact that the number of formations of revoked group members is potentially large, and thus the group controller needs to pre-install auxiliary secrets for each group member just for revocation purposes. For example, in a case where an arbitrary set of members L are revoked from a group G is considered, a rekeying message should be generated and distributed to each of G\L remaining members, who use their preinstalled auxiliary secrets to decipher the rekeying message. Thus, the problem of revoking any arbitrary set of members L can be transformed to solving an exponentially increasing key distribution problem.

To address the scalability issue of the membership revocation in secure group communication, rooted-tree based key distribution schemes have been proposed. In these schemes (illustrated in FIGS. 1 and 2), each member is distributed $\log_2 N$ secrets for group management (i.e., revocation and addition). It is proved that assigning $\log_2 N$ secrets to each member is the information theoretical optimal storage strategy when group size is N.

The rooted-tree structure (see FIG. 1 and FIG. 2) is constructed such that each group member is assigned a unique leaf node in the tree. Every node in the tree, including leaf and non-leaf nodes, is assigned a unique auxiliary secret. Each group member is pre-distributed a set of auxiliary symmetric secrets (or keys) that are along the path from the leaf to the root, in which the root secret is GK for the entire group. Using rooted-tree based solutions, an auxiliary secret can be shared among a partition of members, and a member can be involved in multiple partitions. Typically, the a-ary rooted-tree based solutions require $O(\log_a N)$ storage overhead for each member, where N is the group size. The rooted-tree based multicast group key distribution scheme can be divided into two categories: Non-Flat-Table schemes (FIG. 1) and Flat-Table schemes (FIG. 2).

Non-Flat-Table includes rooted-tree based schemes, such as One-Way Function Trees (OFT), Logical Key Hierarchy Protocol (LKH), and Efficient Large-Group Key Distribution (ELK). One important feature of these schemes is there are $a^d$ distinct secrets at level d in the key distribution tree as illustrated in FIG. 1. In other words, each node is associated with a unique secret. The secrets are not necessarily just pre-distributed random symmetric keys. They may be generated using one-way hash function or pseudo random number generator. Non-Flat-Table schemes only improve the efficiency marginally. This is because, in these solutions, based on the $\log_a N$ pre-distributed auxiliary keys, each group member can merely decrypt $\log_a N$ encrypted streams, as illustrated in FIG. 1.

Flat-Table schemes adopt a slightly different construction, as illustrated in FIG. 2. In Flat-Table schemes, each group member is issued a unique binary ID $b_0 b_1 \ldots b_{n-2} b_{n-1}$ of length n. In addition to the GK, group controller generates 2n auxiliary key encryption keys (KEK) $\{K_{i,b} | i \in Z_n, b \in \{0,1\}\}$. A group member with ID $b_0 b_1 \ldots b_{n-2} b_{n-1}$ holds KEKs $\{K_{i,b_i} | i \in Z_n\}$. The KEKs are organized in the key distribution tree in FIG. 2, where each level corresponding to one bit position in a user's ID. Thus, at each level in the Flat-Table key distribution tree, there are exact 2 distinct KEKs, which map to a bit position in ID. For example, in the FIG. 2, member with ID 011 is predistributed $\{K_{1,1}, K_{2,2}, K_{3,2}\}$. In Flat-Table, the number of partitions each group member can participate is maximized to $2^{\log_2 N} - 1 = N - 1$.

Despite its efficiency, Flat-Table schemes are vulnerable to collusion attacks since FT solutions simply adopt the symmetric KEKs. For example, GMs 001 and 010 can decrypt ciphertexts destined to other GMs, e.g., 011, 000, by combining their symmetric KEKs. To prevent the collusion attacks, CP-ABE-FT was proposed to implement the FT using CP-ABE. However, message size of CP-ABE-FT is linearly growing and, thus, the communication overhead is actually $\log_2^2 N$. Also, CP-ABE-FT utilizes a periodic refreshment mechanism to ensure forward secrecy. If the ID of a revoked GM is re-assigned to another GM before the refreshment, the revoked GM can regain the access to group data and then the group forward secrecy is compromised.

Broadcast Encryption (BE) was also introduced, where a broadcaster encrypts a message for some set of users who are listening to a broadcasting channel and use their private keys to decrypt the message. Compared with traditional one-to-one encryption schemes, BE features superior efficiency. Instead of sending messages encrypted with each individual recipient's public key, the broadcast encrypter broadcasts one encrypted message to be decrypted by multiple recipients with their own private keys.

Although existing BE schemes feature small or constant ciphertext, the number of public key or private key each user needs to perform encryption or decryption are linear on the max number of non-colluding users in the system. In the case where the BE scheme is fully collusion-resistant, the number of public/private key each user needs to store equals to the number of users in the system. For example, in the existing BE system with N users, each user $u_{i \in \{1, \ldots, N\}}$ is generated a public key $PK_i$ and a private key $SK_i$. To encrypt a message to a set of users S, the encrypting method takes input of the set of public keys $\{PK_i | \forall u_i \in S\}$ and output the ciphertext. To decrypt a message, the decrypting method takes input of the private key $SK_i$ of user $u_i$ and the set of all public keys $\{PK_i | \forall u_i \in S\}$ to recover original message. OGK supports many-to-many subgroup communication with $O(\log_2 N)$ storage overhead on GMs.

SUMMARY OF THE INVENTION

Methods and systems for Optimal Group Keying (OGK) that achieves non-colluding and/or the storage-communication optimality are disclosed.

In one embodiment, the method manages group key of group members in a multicast system, each of the group members having a unique ID. The method may comprise determining a group master key and a group public parameter; processing a join request from a new group member and/or transmitting an encrypted message to a subset of the group members.

In one embodiment, processing a join request from a new group member may comprise assigning an available unique ID to the new group member; generating, with a processing device, a private key for the new group member, the new private key based on the group master key and the available unique ID; multicasting a random group key to the group members; and/or communicating the random group key and the private key to the new group member.

In one embodiment, transmitting an encrypted message to a subset of the group members may comprise determining a set of bit assignments for the subset of group members based on the unique IDs of the group members in the subset of group members; encrypting a message based on the master key, the group public parameter, and the set of bit assignments for the subset of group members; and/or multicasting the encrypted message to the group members.

In one embodiment, the method further comprises receiving a first join request from a first group member; assigning a first unique ID to the first group member; generating an initial group key; generating a first private key based on the first unique ID; and/or communicating the first private key and the initial group key to the first group member.

In one embodiment, the method further comprises receiving leave request from a leaving subset of group members; determining a new group master key and a new group public parameter; determining an encrypted private-key update factor based on group members not in the leaving subset of group members; and/or multicasting the encrypted private-key update factor to the group members.

In some embodiments of OGK, a group controller (GC) is responsible for key generation and distribution and the group data are encrypted by a GK. When joining the group, in some embodiments, each group member (GM) is assigned a unique n-bit ID and a set of secrets, in which each bit is one-to-one mapped to a unique secret. Different GMs may share common bits in their IDs, however, the corresponding secrets are different and they are masked by using distinct random numbers. Thus, different GMs cannot collude by combining their secrets that are masked by different random numbers. The set of pre-distributed secrets are denoted as the GM's private key. In some embodiments, a GM can be elected as a GC.

Whenever GMs are revoked from the group, in some embodiments, the GC will multicast an encrypted key-update message. Only the remaining GMs may be able to recover the message and update GK as well as their private keys. In some embodiments, to achieve storage-communication-optimality, tree-based construction is used, and in order to minimize the number of encrypted key-update messages, a minimized boolean function is used, which is in the form of sum-of-product-expression (SOPE) that is calculated based on the IDs of remaining GMs. Each remaining GM may combine n pre-distributed secrets in its private key to decrypt the updated GK.

The disclosed OGK methods and systems can achieve storage-communication optimality with constant message size and immune to collusion attack. The disclosed methods and systems can outperform existing group key management schemes in terms of communication and storage efficiency.

Based on the storage-communication optimality, in some embodiments, the disclosed OGK methods and systems also support dynamic subgroup communication efficiently. In some embodiments, OGK methods and systems allow each GM to initialize a secure subgroup communication with any subset of GMs in a many-to-many communication fashion. Moreover, the number of required messages for subgroup setup is minimized.

Embodiments of the disclosed OGK methods and systems may achieve all the following properties:

Given any number of revoked GMs, the number of encrypted key-update messages is information theoretically minimized to $\approx O(\log_2 N)$.

The size of each encrypted key-update message is constant.

The communication overhead of GM addition is $O(1)$, i.e., only single multicast message is required.

The storage overhead of GC and GM is $O(\log_2 N)$ if GC does not store IDs of GMs.

OGK is collusion resistant and provides forward and backward group key secrecy.

OGK supports dynamic subgroup communication efficiently.

The notations used in this disclosure are listed in Table 1.

TABLE 1

Notations in this Disclosure

| Symbols | Descriptions |
|---|---|
| G | the broadcasting group (includes all group members (GM)) |
| L | a subset of GMs |

TABLE 1-continued

Notations in this Disclosure

| Symbols | Descriptions |
| --- | --- |
| u | a GM |
| B | bit-assignment |
| S | set of bit assignments |
| GC | group controller |
| GM | group member |
| N | the number of GMs in G |
| n | log(N) |

The term "coupled" is defined as connected, although not necessarily directly, and not necessarily mechanically. The terms "a" and "an" are defined as one or more unless this disclosure explicitly requires otherwise.

The term "substantially" and its variations are defined as being largely but not necessarily wholly what is specified as understood by one of ordinary skill in the art, and in one non-limiting embodiment "substantially" refers to ranges within 10%, preferably within 5%, more preferably within 1%, and most preferably within 0.5% of what is specified.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements possesses those one or more steps or elements, but is not limited to possessing only those one or more elements. Likewise, a step of a method or an element of a device that "comprises," "has," "includes" or "contains" one or more features possesses those one or more features, but is not limited to possessing only those one or more features. Furthermore, a device or structure that is configured in a certain way is configured in at least that way, but may also be configured in ways that are not listed.

Other features and associated advantages will become apparent with reference to the following detailed description of specific embodiments in connection with the accompanying drawings.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DETAILED DESCRIPTION

Figure 1:
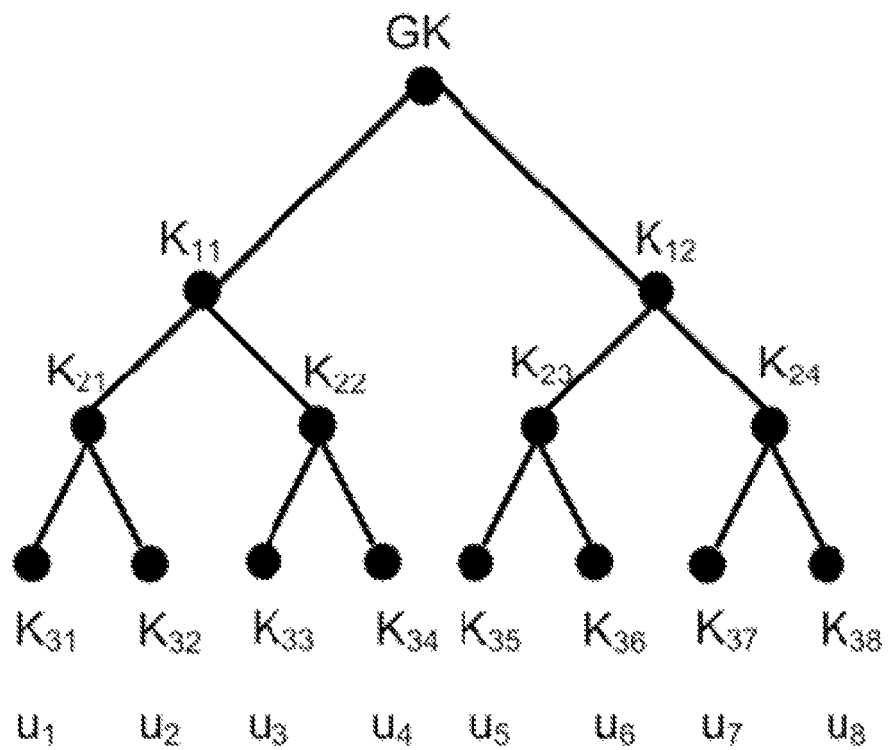
FIG. 1 is a diagram illustrating a rooted-tree based multicast group key distribution scheme using Non-Flat-Table schemes.
Figure 2:
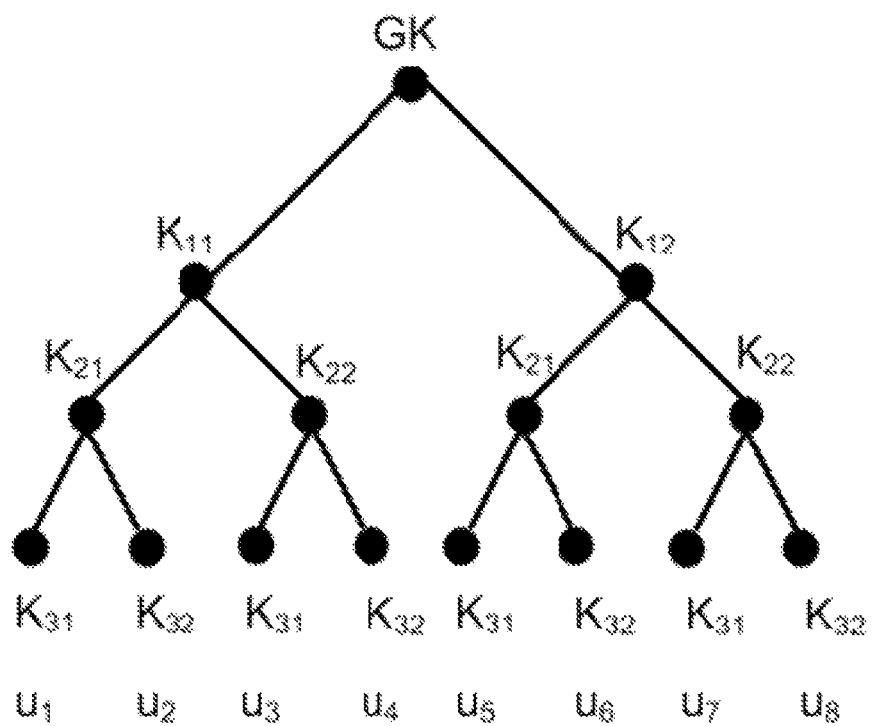
FIG. 2 is a diagram illustrating a rooted-tree based multicast group key distribution scheme using Flat-Table schemes

Various features and advantageous details are explained more fully with reference to the nonlimiting embodiments that are illustrated in the accompanying drawings and detailed in the following description. Descriptions of well known starting materials, processing techniques, components, and equipment are omitted so as not to unnecessarily obscure the invention in detail. It should be understood, however, that the detailed description and the specific examples, while indicating embodiments of the invention, are given by way of illustration only, and not by way of limitation. Various substitutions, modifications, additions, and/or rearrangements within the spirit and/or scope of the underlying inventive concept will become apparent to those skilled in the art from this disclosure.

Certain units described in this specification have been labeled as modules, in order to more particularly emphasize their implementation independence. A module is "[a] self-contained hardware or software component that interacts with a larger system. Alan Freedman, "The Computer Glossary" 268 (8th ed. 1998). A module comprises a machine or machines executable instructions. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also include software-defined units or instructions, that when executed by a processing machine or device, transform data stored on a data storage device from a first state to a second state. An identified module of executable code may, for instance, comprise one or more physical or logical blocks of computer instructions which may be organized as an object, procedure, or function. Nevertheless, the executables of an identified module need not be physically located together, but may comprise disparate instructions stored in different locations which, when joined logically together, comprise the module, and when executed by the processor, achieve the stated data transformation.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

In the following description, numerous specific details are provided, such as examples of programming, software modules, user selections, network transactions, database queries, database structures, hardware modules, hardware circuits, hardware chips, etc., to provide a thorough understanding of the present embodiments. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 3:
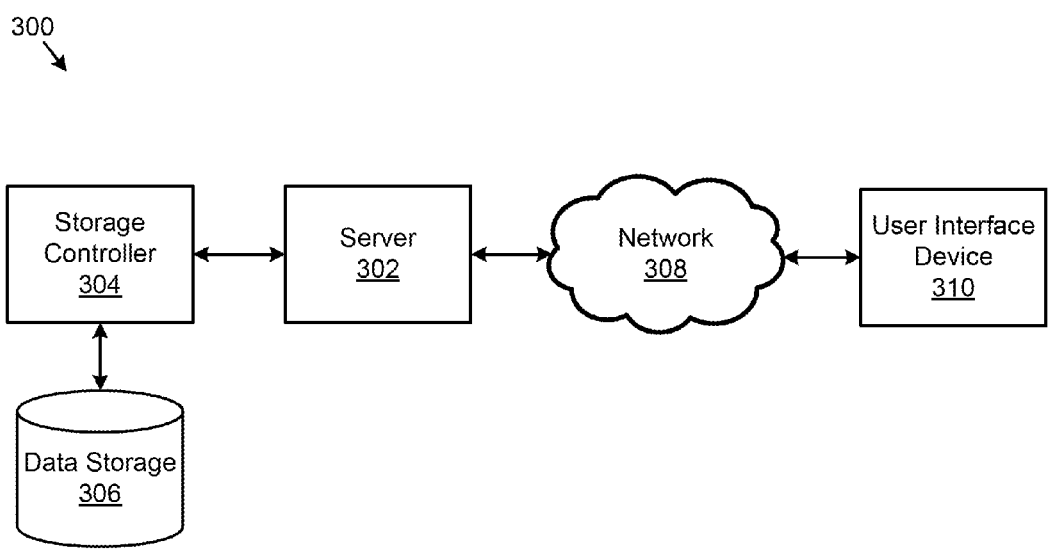
FIG. 3 illustrates an embodiment of a system for optimal group key management.

FIG. 3 illustrates one embodiment of a system 300 for optimal group key management for secure multicast communication. The system 300 may include a server 302—sometimes referred to in this disclosure as a group controller server, a data storage device 304, a network 308, and a user interface device 310. In a further embodiment, the system 300 may include a storage controller 306, or storage server configured to manage data communications between the data storage device 304, and the server 302 or other components in communication with the network 308. In an alternative embodiment, the storage controller 306 may be coupled to the network 308.

In one embodiment, the user interface device 310 is referred to broadly and is intended to encompass a suitable processor-based device such as a desktop computer, a laptop computer, a Personal Digital Assistant (PDA), a mobile communication device or organizer device having access to the network 308. In a further embodiment, the user interface device 310 may access the Internet to access a web application or web service hosted by the server 302 and provide a user interface for enabling a user to enter or receive information.

The network 308 may facilitate communications of data between the server 302 and the user interface device 310. The network 308 may include any type of communications network including, but not limited to, a direct PC to PC connection, a local area network (LAN), a wide area network (WAN), a modem to modem connection, the Internet, a combination of the above, or any other communications network now known or later developed within the networking arts which permits two or more computers to communicate, one with another.

In one embodiment, the server 302 is configured to determine a group master key and a group public parameter, process a join request from a new group member, and transmit an encrypted message to a subset of the group members. Additionally, the server may access data stored in the data storage device 304 via a Storage Area Network (SAN) connection, a LAN, a data bus, or the like.

The data storage device 304 may include a hard disk, including hard disks arranged in an Redundant Array of Independent Disks (RAID) array, a tape storage drive comprising a magnetic tape data storage device, an optical storage device, or the like. In one embodiment, the data storage device 304 may store health related data, such as insurance claims data, consumer data, or the like. The data may be arranged in a database and accessible through Structured Query Language (SQL) queries, or other data base query languages or operations.

The server 302 may host a software application configured for optimal group key management. The software application may further include modules for interfacing with the data storage devices 306, interfacing a network 308, interfacing with a user, and the like. In a further embodiment, the server 302 may host an engine, application plug-in, or application programming interface (API). In another embodiment, the server 302 may host a web service or web accessible software application.

Any suitable processor-based device may be utilized to achieve the architecture of system 300 including without limitation, including, desktop computers, laptop computers, tablet computers, personal data assistants (PDAs), computer game consoles, and multi-processor servers. Moreover, the present embodiments may be implemented on application specific integrated circuits (ASIC) or very large scale integrated (VLSI) circuits. In fact, persons of ordinary skill in the art may utilize any number of suitable structures capable of executing logical operations according to the described embodiments.

Figure 4:
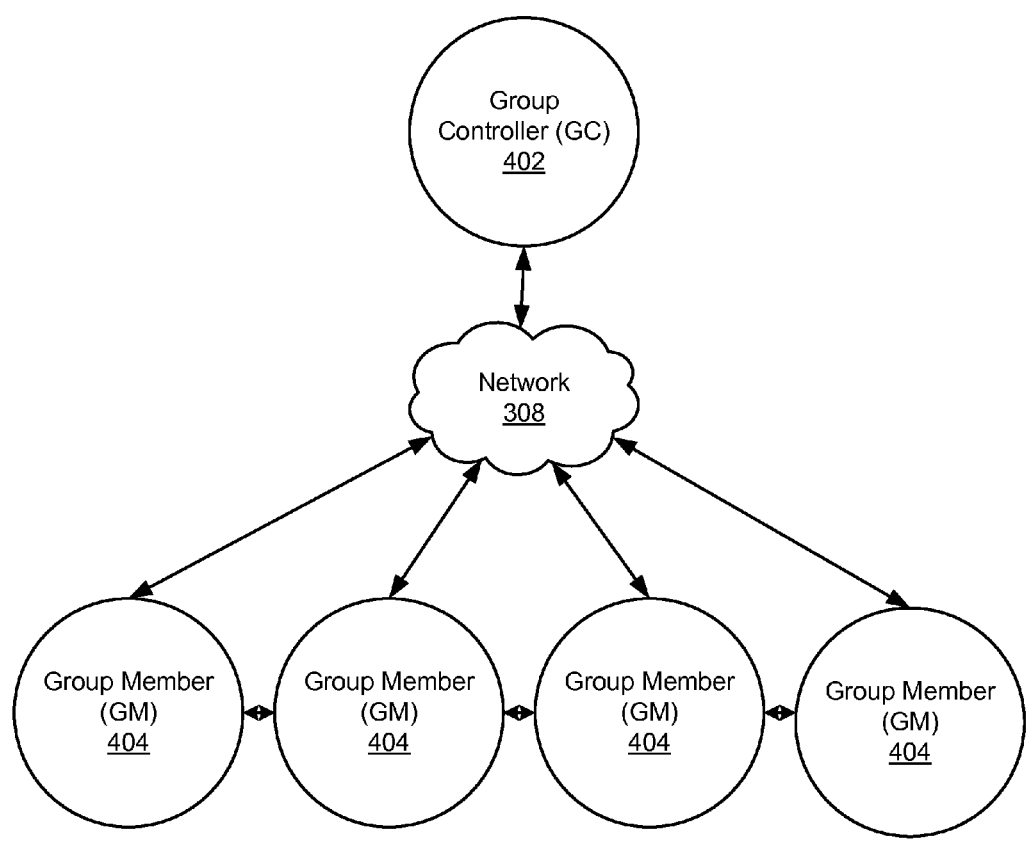
FIG. 4 illustrates an embodiment of a multicast scheme having Group Members (GM) 404 and a Group Controller (GC) 402.

The communication model of OGK is based on multicast. FIG. 4 illustrates an embodiment of a multicast scheme having Group Members (GM) 404 and a Group Controller (GC) 402. In some embodiments, GC 402 is the same as GC 402. Through multicast communication, GC may be able to communicate to each of the various GMs through network 308 (e.g., one-to-many communication). Furthermore, each of the various GMs 404 may be able to selectively communicate with each other as well as the GC 402 (e.g., many-to-many). All GMs belong to a multicast group $G=\{u_1, u_2, \ldots, u_{|G|}\}$. Each GM 404 u may be able to send or receive data. The multicast group is associated with a trusted server, referred as GC, responsible for managing the membership. Each GM 404 can initialize a secure subgroup communication with any subset of GMs. The subgroup traffic is multicasted to whole group while only a designated subset of GMs can decrypt the data.

Pairing is a bilinear map function $e: G_1 \times G_2 \to G_T$, where $G_1$, $G_2$ and $G_T$ are three cyclic groups with large prime order p. The $G_1$ and $G_2$ are additive groups and $G_T$ is multiplicative group. The discrete Logarithm Problem on $G_1$, $G_2$ and $G_T$ are hard. Pairing has the following properties:

Bilinearity: $e([a]g, [b]h) = e(g,h)^{ab}$, $\forall g \in G_1, h \in G_2, a, b \in Z^*_p$.

Nondegeneracy: $e(g_0, h_0) \neq 1$ where $g_0$ is the generator of $G_1$ and $h_0$ is the generator of $G_2$.

Computability: There exists an efficient algorithm to compute the pairing.

Embodiments of the disclosed methods and systems are configured to be secure and protect from attacks to the security. An attackers' goal may be to reveal multicasted data. For example, consider the attacking scenarios in the following cases:

1) Breaking the Group Secrecy: Non-GMs try to reveal the multicasted group data.

2) Breaking Backward Secrecy: GMs 404 try to reveal any group data that were transmitted before they joined the group.

3) Breaking Forward Secrecy: GMs 404 try to continue reveal the group data that are transmitted after they left the group.

4) Collusion Attacks: Multiple GMs 404 combine their pre-distributed secrets to decrypt the ciphertext not intended to them. One example of this attack is that when multiple GMs 404 are revoked from the group, they try to collude to continue decrypting group data. Another example is that when a secure conference is held among a subgroup of GMs 404, some excluded GMs 404 try to listen to the conference.

In the disclosed OGK methods and systems, each GM 404 may be associated with a unique binary ID: $b_0 b_1 \ldots b_{n-2} b_{n-1}$, where $n = \log_2 N$. The ID may be issued by the GC when a GM joins the group. Once the GM left the group, his/her ID may be re-assigned to other joining GMs.

A logic literal, which is called bit-assignment, $B_i$ or $\overline{B}_i$ can be used to indicate the binary value at position i in a particular ID. $B_i$ indicates the $b_i=1$; $\overline{B}_i$ indicates the $b_i=0$. For a group with N GMs, the length of an ID is $n = \log_2 N$ and the total number of bit-assignments is 2n; that is, two binary values are mapped to one bit position. The set of all possible bit-assignments is called to be Universe U, which contains 2n bit-assignments.

In some embodiments, a GM u can be uniquely identified by the set of bit-assignments $S_u$ associated with u's ID. Also, multiple GMs may have a common subset of bit-assignments. For example, in FIG. 5, a GM $u_1$'s ID is 000 and a GM $u_2$'s ID is 001, $S_{u_1} = \{\overline{B}_0, \overline{B}_1, \overline{B}_2\}$ and $S_{u_2} = \{\overline{B}_0, \overline{B}_1, B_2\}$ and $S_{u_1} \cap S_{u_2} = \{\overline{B}_0, \overline{B}_1\}$.

Figure 5:
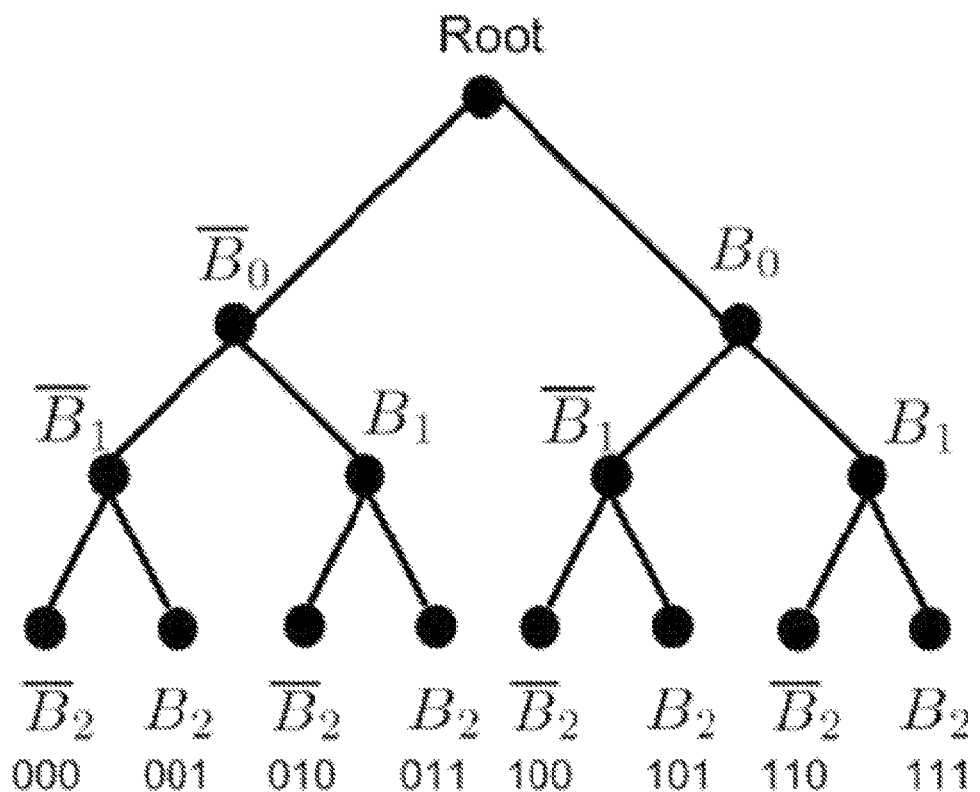
FIG. 5 illustrates an embodiment of a root node structure used in some embodiments of OGK.

In the disclosed OGK methods and systems, the GMs can be organized as leafs in a binary tree with each non-root node marked with a bit-assignment (FIG. 5). Note that there are only 2n distinct non-root nodes in the tree and each level contains 2 distinct nodes, which is different from existing tree-based schemes OFT, LKH, and ELK, where there are $2^d$ distinct nodes at level d. The ID of a GM can be represented by the bit-assignment nodes from the root down to the leaf. Thus, any two GMs will have at least one different bit-assignment.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 6:
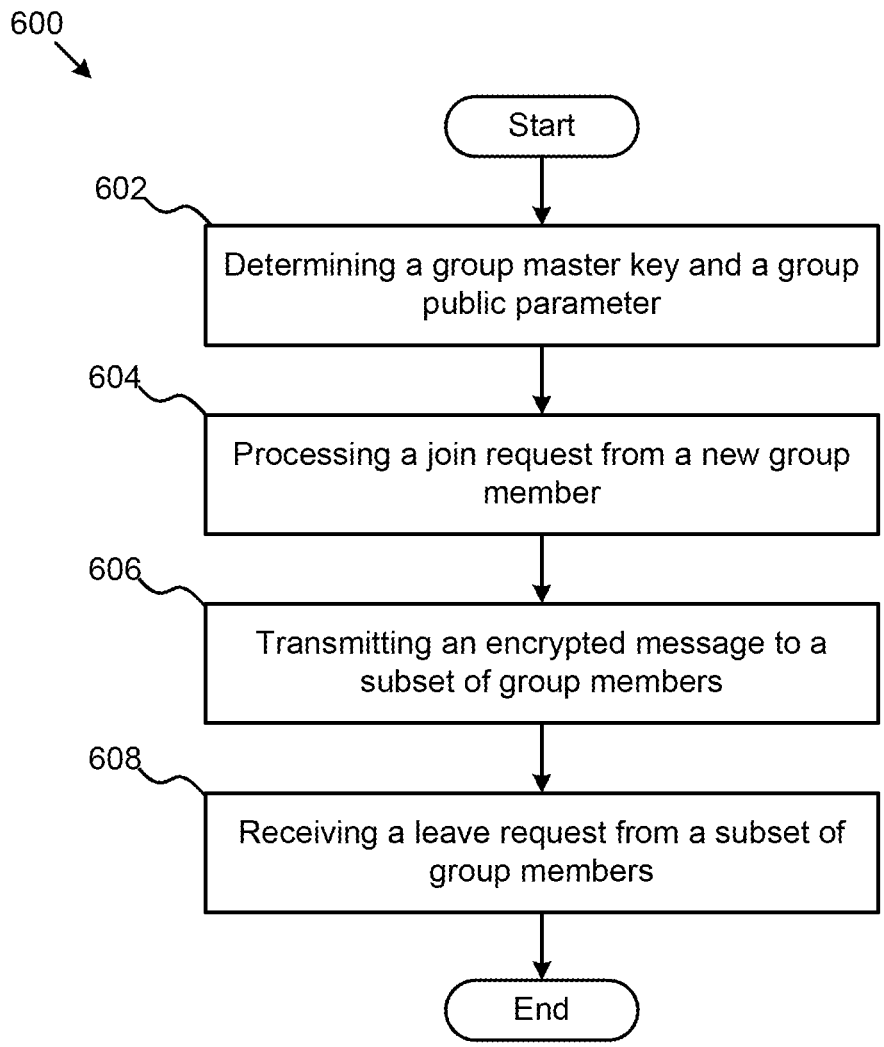
FIG. 6 illustrates an embodiment of a method for optimal group key management—from the perspective of a GC.

FIG. 6 illustrates one embodiment of a method 600 for OGK. In particular, the method steps disclosed in FIG. 6 disclose embodiments of group management from the perspective of a GC. For example, these method steps may be performed by a server—such as server 302—configured to perform them located on the GC. In one embodiment, the method 600 starts by determining 602 a group master key and a group public parameter. The method 600 may continue by processing 604 a join request from a new group member. In some embodiments, this may include assigning an available unique ID to the new group member, generating, with a processing device, a private key for the new group member, the new private key based on the group master key and the available unique ID, multicasting a random group key to the group members, and/or communicating the random group key and the private key to the new group member. The method 600 may also include transmitting 606 an encrypted message to a subset of the group members. In some embodiments, this may include determining a set of bit assignments for the subset of group members based on the unique IDs of the group members in the subset of group members, encrypting a message based on the master key, the group public parameter, and the set of bit assignments for the subset of group members, and/or multicasting the encrypted message to the group members.

In some embodiments, the method 600 may be configured to receive joint requests (now shown) a first group member. This may include receiving a first join request from a first group member, assigning a first unique ID to the first group member, generating an initial group key, and generating a first private key based on the first unique ID and/or communicating the first private key and the initial group key to the first group member.

In some embodiments, the method 600 may also be configured to receive 608 leave requests for one or more group members. This process may include receiving leave request from a leaving subset of group members, determining a new group master key and a new group public parameter, determining an encrypted private-key update factor based on group members not in the leaving subset of group members, and multicasting the encrypted private-key update factor to the group members.

As discussed with regard to FIG. 4, a multicast system has a GC in addition to one or more group members. In some embodiments, the group members may also have a server configured to perform one or more method steps—sometimes referred to as the group member server. In some embodiments, a group member may be configured to join a group. In some embodiments, joining a group may include transmitting a join request to the GC and receiving a private key and a group key from the GC. Additionally, the group members may be configured to receive an encrypted message. Receiving an encrypted message may include determining encryption eligibility and decrypting the encrypted message based on the private key.

In some embodiments, a group member may also be configured to receive an updated group key in response to the new group member joining from the GC.

In some embodiments, the group member may be configured to transmit a leave request to the GC, and in a particular embodiment the group member maybe configured to receive an encrypted private-key update factor and update the private key based on the encrypted private-key update factor.

Figure 7:
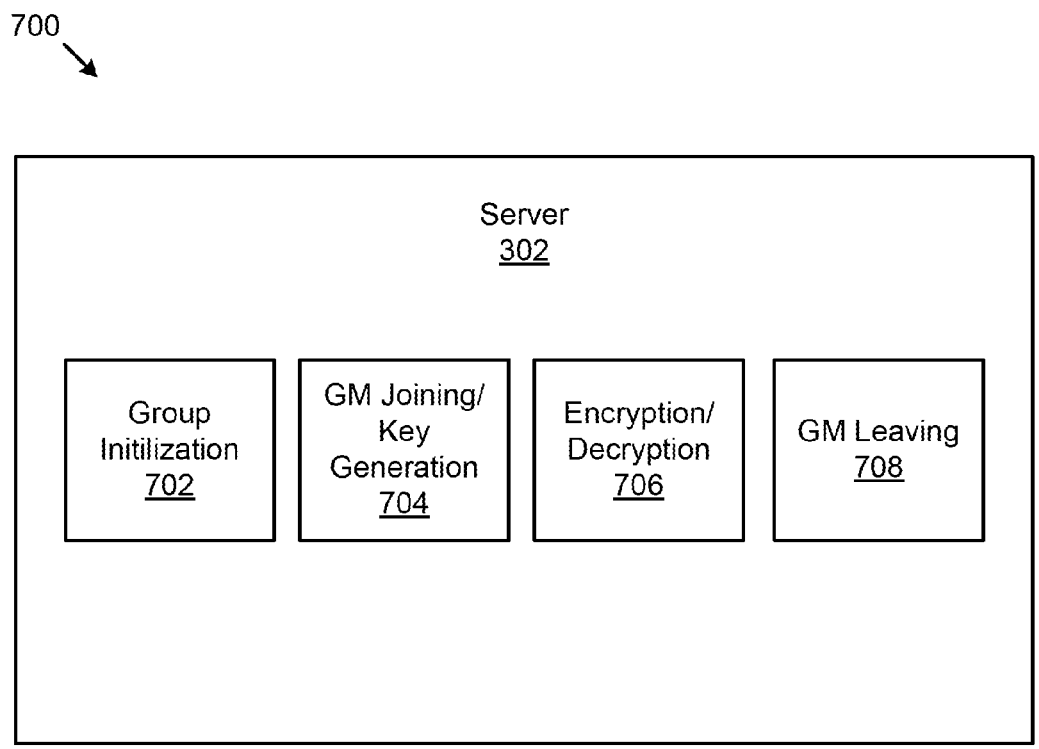
FIG. 7 illustrates an embodiment of an apparatus for optimal group key management.

Specific embodiments of the method steps may be performed by the modules and methods steps discussed with regards to FIG. 7. FIG. 7 illustrates one embodiment of an apparatus 700 for optimal group key management. FIG. 7 generally illustrates an embodiment of the GC server. In various embodiments, the GMs may have a processing device (e.g., a mobile processor). The GM processing device may be less robust than the embodiment of the GC server illustrated in FIG. 7. However, specific embodiments of the GM server may be configured to perform specific methods discussed with regards to the modules of FIG. 7. For example, in some embodiments, the GM may be configured able to initiate a group communication to a subgroup of other GMs—without the use of the GC server.

In one embodiment, the apparatus 700 is a server 302—sometimes referred to as the GC server—configured to load and operate software modules 702-708 configured for optimal group key management. Alternatively, the apparatus 700 may include hardware modules 702-708 configured with analog or digital logic, firmware executing FPGAs, or the like configured to generate method steps of method 700. In such embodiments, the apparatus 700 may include a group initialization module 702, GM joining/key generation module 704, encryption/decryption modules 706, and GM leaving module 708.

Group Initialization Module

Specific embodiments of how the GC may setup the multicast group are disclosed. In some embodiments, first, GC chooses bilinear map over group $G_1$, $G_2$ and $G_T$ of prime order p. Assume the generator of $G_1$ is g and generator of $G_2$ is h. Also, GC chooses a publicly known one-way function H. Then, it chooses two non-trivial random numbers $\alpha$, $\beta \in Z^*_p$. For simplicity, the universe of bit-assignments U is mapped to the first |U| members of $Z^*_p$, i.e., the integers $\{1, 2, \ldots, |U|\}$. For each bit-assignment $B \in U$, GC chooses a non-trivial random number $y_B \in Z_p$. This set of 2n random numbers are denoted as $$Y_B = \{y_{B_0}, y_{\bar{B}_0}, \ldots, y_{B_{n-1}}, y_{\bar{B}_{n-1}}\}$$

For each $y_B \in Y_B$, GC may also generate the tuple $\langle e(g,h)^{\alpha y_B}, g^{\beta y_B} \rangle$. The set of 2n tuples are denoted as:

$$E_B = \{\langle e(g,h)^{\alpha y_B}, g^{\beta y_B}\rangle | \forall y_B \in Y_B\}$$

GC may publish the group public parameter:

$$GP = \{e, g \in G_1, h \in G_2, H, E_B\}.$$

On the other hand, GC protects the group master key:
$$MK=\{\alpha,\beta,Y_B\}.$$

GM Joining and Key Generation Modules

When a new GM u joins the group, in some embodiments, u needs to setup a secure channel with the GC using either a pre-shared key or public key certificates. GC may then check whether the GM is authorized to join. Once the checking is passed, GC may assign a unique ID $b_{n-1}{}^u b_{n-2}{}^u \ldots b_0{}^u$ and a set of bit assignments $S_u$ to u.

In some embodiments, once u is admitted to the group, GC may run key generation method KeyGen(MK,$S_u$) to generate private key $SK_u$ for u, where MK is the group master key and $S_u$ is the set of bit-assignments in u' ID. The method may first choose a non-trivial random number $r \in Z^*_p$. Then, it may compute $$h^{\frac{\alpha+r}{\beta}} \in G_2.$$

Finally, for each bit-assignment $B \in S_u$, the KeyGen method may calculate a blinded secret share $h^{ry_B} \in G_2$. The outputted private key $$SK_u: \left\{ D = h^{\frac{\alpha+r}{\beta}}, \forall B \in S_u : D_B = h^{ry_B} \right\}$$

If u is the first GM in the group, GC, in some embodiments may, generate an initial GK and send the private key $\{SK_u, GK\}$ to the new GM u through a secure channel. If u is not the first joining GM, to preserve backward secrecy, GC may generate another random key GK' and multicast $\{GK'\}_{GK}$. Each GM other than u can decrypt the message and replace GK with GK'. Finally, GC may send $\{SK_u, GK'\}$ to the new GM u through a secure unicast channel. In embodiments of the join process, besides the unicast communication, GC only needs to multicast one message, i.e., $\{GK'\}_{GK}$. Thus, the communication overhead for GMs join is O(1).

One observation is that GC, in a preferred embodiment, does not need to store the ID or private keys of any GMs. Thus, the storage overhead of GC can be significantly reduced to $O(\log_2 N)$, since GC is only required to store the system parameters and master key.

Encryption and Decryption Overview

As has been mentioned, OGK allows GC and GMs to securely communicate with any subset of GMs. Whenever, GMs are revoked from the group, GC needs to multicast a key update message to all remaining GMs, who will update their GK as well as private keys. On the other hand, GMs can initialize a secure subgroup communications with any subset of GMs.

Embodiments of how a GC or GM can encrypt a message with a set of bit-assignment S are disclosed, so that only GMs whose IDs satisfy S can decrypt the message. For example, in a three-bit-ID group, if a ciphertext is encrypted by using bit-assignment S=$\{\overline{B}_0, B_1\}$, GMs with IDs 010 and 011 can decrypt the ciphertext.

Encryption Module

Encrypt(GP,S,M) encryption method, in specific embodiments, takes inputs of the group parameter GP, a set of bit-assignment S, the message M, and returns the ciphertext CT. In a specific embodiment, given the set of bit-assignment S, it is easy to calculate the following terms:

$$e(g,h)^{\alpha Y_S} = e(g,h)^{\alpha \sum_{B \in S} y_B}$$
$$= \prod_{B \in S} e(g,h)^{\alpha y_B}$$

$$g^{\beta Y_S} = g^{\beta \sum_{B \in S} y_B}$$
$$= \prod_{B \in S} g^{\beta y_B}$$

For example, if $$S = \{\overline{B}_0, B_1, B_2\}, e(g,h)^{\alpha Y_S} = e(g,h)^{\alpha(y_{\overline{B}_0} + y_{B_1} + y_{B_2})}.$$

After calculating $e(g,h)^{\alpha Y_S}$ and $g^{\beta Y_S}$, the Encrypt method, in a specific embodiment, generates a non-trivial random number $t \in Z^*_p$. Then, the method computes $C_0 = M \oplus e(g,h)^{\alpha Y_S}$, $C_1 = g^{\beta t Y_S}$, $C_2 = g^t$, where $\oplus$ is bitwise XOR operation. Thus, the ciphertext is as:

$$CT:\{S, C_0 = M \oplus e(g,h)^{\alpha Y_S}, C_1 = g^{\beta t Y_S}, C_2 = g^t\}$$

Decryption Module

On receiving the CT, those GMs who satisfy the bit-assignment CT.S can decrypt the CT by performing decryption method Decrypt(GP, SK, CT).

The Decrypt method, in a specific embodiment, may first check whether the GM u is eligible to decrypt the message by testing whether CT.S $\subseteq S_u$, where CT.S represents the bit assignments associated with the ciphertext CT. Then, for each bit assignment $B \in$ CT.S, the method use u's pre-distributed secret shares $D_B = h^{ry_B}$ to compute:

$$F = \prod_{B \in CT.S} D_B$$
$$= \prod_{B \in CT.S} h^{ry_B}$$
$$= h^{r \sum_{B \in CT.S} y_B}$$
$$= h^{r Y_{CT.S}}$$

Next, the method computes:

$$A_1 = e(C_1, D)$$
$$= e(g,h)^{(\alpha+r)t Y_{CT.S}}$$

and $$A_2 = e(C_2, F)$$
$$= e(g,h)^{rt Y_{CT.S}}$$

Then the method divides $A_1$ by $A_2$ and gets:

$$A_3 = A_1/A_2$$
$$= e(g, h)^{\alpha t Y_{CT} \cdot s}$$

which blinds the plaintext in ciphertext. Finally, the method unblinds the ciphertext by calculating $C_0 \oplus A_3 = M$.

Encryption Module: Subgroups

Various embodiments of how GC or GMs can securely communicate with arbitrary subgroup of members optimally are presented. Some of the terms used in the following are defined as follows:
  Literal: A variable or its complement, e.g., $B_1$, $\overline{B}_1$, etc.
  Product Term: Literals connected by AND gate, e.g., $\overline{B}_2 B_1 \overline{B}_0$.
  Sum-of-Product Expression (SOPE): Product terms connected by OR, e.g., $\overline{B}_2 B_1 B_0 + B_2$ Given a subgroup of GMs L, a boolean membership function $M_L$ ($B_0$, $B_1$, ..., $B_{n-2}$, $B_{n-1}$), which is in the form of SOPE, is used to determine the membership of this subgroup. Formally, the following properties of membership functions hold:

$$M_L(b_0^u, b_1^u, \ldots, b_{n-2}^u, b_{n-1}^u) = \begin{cases} 0 & \text{iff } u \in G \setminus L \\ 1 & \text{iff } u \in L. \end{cases}$$

For example, if the subgroup L={000,001,011,111}, then $M = \overline{B}_0 \overline{B}_1 \overline{B}_2 + \overline{B}_0 \overline{B}_1 B_2 + \overline{B}_0 B_1 B_2 + B_0 B_1 B_2$.

In some embodiments, the GC or a GM runs the Quine-McCluskey algorithm to reduce $M_L$ to minimal SOPE $M_L^{min}$. One having skill in the art will recognize other algorithms to reduce $M_L$ to minimal SOPE $M_L^{min}$. The reduction can consider do not care values on those IDs that are not currently assigned to any GM to further reduce the size of $M_L^{min}$. Since $M_L^{min}$ is in the form of SOPE, encryption is performed on each product term. That is, for each product term E in $M_L^{min}$, Encrypt method encrypts the message with the set of bit-assignment S that contains all literals in E. The total number of encrypted message equals to the number of product terms in $M_{min}$.

For example, if L={000,001,011,111}, $M_L^{min} = \overline{B}_0 \overline{B}_1 + B_1 B_2$. It can be found that $M_L^{min}$ contains 2 product terms. The message M for the subgroup L can be encrypted as $M_{\{\overline{B}_0, \overline{B}_1\}}$ and $M_{\{B_1, B_2\}}$, respectively.

GM Leaving Module

In some embodiments, when several GMs (denoted by set L) are revoked from the group, GC needs to update the {MK, GP, GK} as well as the private key of each remaining GM $u \in G \setminus L$. Various embodiments are disclosed to show how this process can be done efficiently.

In some embodiments, the GC may first change MK to MK'={$\alpha'$, $\beta$, $Y_B$}, where $\alpha'$ is randomly selected in $Z_p$. Also, group public parameter GP is updated accordingly. Then, GC may multicast an encrypted key-update factor $$kuf = h^{\frac{\alpha'-\alpha}{\beta}}.$$

Note that kuf is encrypted, and it cannot be decrypted by any $u \in L$.

In some embodiments, each GM $u \in G \setminus L$ may update the component D in its private key $SK_u$ using the $$kuf = g^{\frac{\alpha'-\alpha}{\beta}}.$$

The new D may be updated by the following method:

$$D \cdot h^{\frac{\alpha'-\alpha}{\beta}} = h^{\frac{a+r}{\beta}} \cdot h^{\frac{\alpha'-\alpha}{\beta}} = h^{\frac{a+r+\alpha'-\alpha}{\beta}} = h^{\frac{\alpha'+r}{\beta}}.$$

Also, each $u \in G \setminus L$ updates their GK simply by computing $$GK' = H\left(h^{\left(\frac{\alpha'-\alpha}{\beta}\right)}\right).$$

GM Leaving Module: Single or Multiple Leave

In one embodiment, only one GM leaves the group. For example, if the leaving GM u's ID is 101 with bit-assignment $S_u = \{B_0, \overline{B}_1, B_2\}$, the key updating message may be encrypted as $\{kuf\}_{\{\overline{B}_0\}}$, $\{kuf\}_{\{B_1\}}$, $\{kuf\}_{\{\overline{B}_2\}}$ and may be multicased to the entire group. If ID 100 is not assigned, $\{kuf\}_{\{\overline{B}_2\}}$ may not needed. Although the leaving member may intercept the transmitted messages, it cannot decrypt them since every message is encrypted with a bit assignment that the leaving member does not possess. On the other hand, each of remaining GMs can decrypt at least one of the multicasted messages.

In certain embodiments, multiple GMs leave the multicast group. Given the set of leaving GMs L, GC can easily derive the set of remaining GMs, i.e. G\L, as well as the set of unassigned IDs if GC stores all assigned IDs. If GC does not store assigned ID, GC can assume all IDs are assigned. Then, the GC may run the Quine-McCluskey algorithm—or other like algorithm—to reduce the membership function $M_{G \setminus L}$ to minimal SOPE. Then, GC may encrypt the key updating factor for each product term. The total number of encrypted key updating factors equals to the number of product terms in $M_{min}$. For example, it is assumed that two GMs {000,010} leave, five GMS {001,011,100,101,110} remain, and {111} is not assigned to any GM (i.e., the ID bit assignments are do not care). With the considerations do not care values, M can be reduced to $M_{G \setminus L}^{min} = B_0 + B_2$. GC need to multicast two messages $\{kuf\}_{\{B_0\}}$ and $\{kuf\}_{\{B_2\}}$.

Implementation of OGK Toolkit

Practical issues in implementing OGK are disclosed, including choice of parameters, optimization methods on further reducing ciphertext size. The disclosed OGK toolkit is implemented as a set of tools and a core library, which has been made available on the web under the GPL. The disclosed implementation uses the Pairing Based Cryptography (PBC) library.

OGK is implemented over two parameter sets, each of which is specially optimized for different purposes. The Type-A curve is a on supersingular curve $y^2 = x^3 + x$ over 512-bit finite field, which defines a 160-bit elliptic curve group and features fastest pairing computation. On the other hand, the Type-D curve is chosen using MNT method and has shortest group elements. Note that each element can be compressed to reduce size. In the actual implementation and performance evaluation, the compressed Type-D element was adopted to minimize storage and communication overhead. The benchmark was performed on a modern workstation which has a 3.0 GHz Pentium 4 cpu with 2 MB cache and 1.5 GB memory and runs Linux 2.6.32 kernel. The Type-A and Type-D parameters are compared in Table 2.

TABLE 2

Comparison between Type-A and Type-D curves.

| | Type-A | Type-D |
|---|---|---|
| Base Field Size (bits) | 512 | 159 |
| Embedded Degree (k) | 2 | 6 |
| DLP Security (bits) | 1024 | 954 |
| Pairing (ms) | 6.4 | 15.4 |
| $G_1$ Element Size (bytes) | 65 | 21 |
| $G_2$ Element Size (bytes) | 65 | 61 |
| $G_T$ Element Size (bytes) | 128 | 120 |
| Exp $G_1$ (ms) | 7.2 | 3.6 |
| Exp $G_2$ (ms) | 7.3 | 21.1 |

TABLE 2-continued

Comparison between Type-A and Type-D curves.

| | Type-A | Type-D |
|---|---|---|
| Random $G_1$ (ms) | 8.4 | 3.5 |
| Random $G_2$ (ms) | 8.5 | 20.9 |
| Random $G_T$ (ms) | 3.0 | 8.0 |

Total multicast data size can be reduced by combining common $C_2$ components for different product terms in the same membership function. For example, if L={000,001,011, 111}, $M_L^{min} = \bar{B}_0 \bar{B}_1 + B_1 B_2$. It can be found that $M_L^{min}$ contains 2 product terms. The message M for L can be encrypted as $M_{\{\bar{B}_0, \bar{B}_1\}}$ and $M_{\{B_1, B_2\}}$. As presented in this disclosure, the 2 encrypted messages are constructed as $$\{S_1 = \{\bar{B}_0, \bar{B}_1\}, C_0 = Me(g, h)^{\alpha t Y_{S_1}}, C_1 = g^{\beta t Y_{S_1}}, C_2 = g^t\},$$

and $$\{S_2 = \{B_1, B_2\}, C_0 = Me(g, h)^{\alpha t Y_{S_2}}, C_1 = g^{\beta t Y_{S_2}}, C_2 = g^t\}.$$

Note that the $C_2$ components in the these 2 messages are identical for the same random t.

Performance Analysis

The performance of OGK scheme is analyzed and compared with several related solutions: Flat Table scheme (FT), FT implemented using CP-ABE (FT-ABE), Subset-Diff broadcast encryption scheme, BGW broadcasting encryption, and Non-Flat-Table tree-based schemes (e.g., OFT, LKH, ELK, etc.). The performance is assessed in terms of communication overhead (number and size of messages incurred by join and leave operations), storage overhead (group data stored on the GC and GM), and computation overhead (number of cryptographic operations needed in encryption and decryption operations). The group size is denoted as N, the number of leaving GMs as l. Also, for the Subset-Diff scheme, t denotes the maximum number of colluding users to compromise the ciphertext. The summary of comparative results is presented in Table 3.

TABLE 3

Comparison of communication overhead and Storage overhead in different group key management schemes

| | Communication Overhead | | | Storage Overhead | |
|---|---|---|---|---|---|
| Scheme | join | single leave | multiple leaves | GC | GM |
| OGK | $O(1)$ | $O(\log_2 N)$ | $\approx O(\log_2 N)$ | $O(\log_2 N)/O(N)$ | $O(\log_2 N)$ |
| Flat-Table | $O(\log_2 N)$ | $O(\log_2 N)$ | $\approx O(\log_2 N)$ | $O(\log_2 N)/O(N)$ | $O(\log_2 N)$ |
| Flat-Table-ABE | $O(1)$ | $O(\log_2 N)$ | $\approx (\log_2^2 N)$ | $O(\log_2 N)/O(N)$ | $O(\log_2 N)$ |
| Subset-Diff | N/A | $O(t \cdot \log_2^2 t \cdot \log_2 m)$ | $O(t \cdot \log_2^2 t \cdot \log_2 N)$ | $O(N)$ | $O(\log_2^2 N)$ |
| BGW | N/A | $O(N^{1/2})$ | $O(N^{1/2})$ | $O(N^{1/2})$ | $O(N^{1/2})$ |
| Non-Flat-Table-Tree | $O(1)$ | $O(\log_2 N)$ | $O(l \cdot \log_2 N)$ | $O(N)$ | $O(\log_2 N)$ |

N: the number of group members;
l: the number of leaving members;
t: maximum number of colluding users to compromise the ciphertext.

All of the methods disclosed and claimed herein can be made and executed without undue experimentation in light of the present disclosure. While the apparatus and methods of this invention have been described in terms of preferred embodiments, it will be apparent to those of skill in the art that variations may be applied to the methods and in the steps or in the sequence of steps of the method described herein without departing from the concept, spirit and scope of the invention. In addition, modifications may be made to the disclosed apparatus and components may be eliminated or substituted for the components described herein where the same or similar results would be achieved. All such similar substitutes and modifications apparent to those skilled in the art are deemed to be within the spirit, scope, and concept of the invention as defined by the appended claims.

What is claimed is:

1. A method for group key management of group members in a multicast system, each of the group members having a unique ID, comprising:
   determining a group master key and a group public parameter;
   processing a join request from a new group member, comprising:

assigning an available unique ID with a corresponding bit-assignment to the new group member;

generating, with a processing device, a set of private keys for the new group member, the set of private keys based on the group master key and the bit-assignment corresponding to the available unique ID such that each private key of the set of private keys is mapped to a bit of the bit-assignment;

multicasting a random group key to the group members; and communicating the random group key and the set of private keys to the new group member; and transmitting an encrypted message to a subset of the group members comprising:

determining a set of bit assignments for the subset of group members based on the unique IDs of the group members in the subset of group members;

encrypting a message based on the master key, the group public parameter, and the set of bit assignments for the subset of group members; and multicasting the encrypted message to the group members.

2. The method of claim 1, further comprising:
receiving a first join request from a first group member;
assigning a first unique ID to the first group member;
generating an initial group key;
generating a first private key based on the first unique ID; and
communicating the first private key and the initial group key to the first group member.

3. The method of claim 1, further comprising:
receiving leave request from a leaving subset of group members;
determining a new group master key and a new group public parameter;
determining an encrypted private-key update factor based on group members not in the leaving subset of group members; and
multicasting the encrypted private-key update factor to the group members.

4. A system for group key management comprising:
a group controller and group members, the group controller and group members communicatively coupled through a network, and each group member comprising a unique ID;

the group controller having a group controller server comprising logic circuitry configured to:
determine a group master key and a group public parameter;
process a join request from a new group member, comprising:
assigning an available unique ID with a corresponding bit-assignment to the new group member;
generating, with a processing device, a set of private key for the new group member, the set of private keys based on the group master key and the bit-assignment corresponding to the available unique ID such that each private key of the set of private keys is mapped to a bit of the bit-assignment;
multicasting a new group key to the group members;
communicating the new group key and the set of private keys to the new group member;
transmit an encrypted message to a subset of the group members comprising;
determining a set of bit assignments for the subset of group members based on the unique IDs of the group members in the subset of group members;
encrypting a message based on the master key, the group public parameter, and the set of bit assignments for the subset of group members;
multicasting the encrypted message to the group members; and
the group members each having a group member server configured to:
join a group, comprising:
transmit a join request to the group controller; and
receive a private key and a group key from the group controller; and
receive an encrypted message, comprising:
determine encryption eligibility; and
decrypt the encrypted message based on the private key.

5. The system of claim 4, the group member server further configured to:
receive an updated group key in response to the new group member joining from the group controller.

6. The system of claim 5, the group member server further configured to:
transmit a leave request to the group controller.

7. The system of claim 5, the group member server further configured to:
receive an encrypted private-key update factor; and
update the private key based on the encrypted private-key update factor.

8. The system of claim 5, the group controller server further configured to:
receive a first join request from a first group member;
assign a first unique ID to the first group member;
generate an initial group key;
generate a first private key based on the first unique ID; and
communicate the first private key and the initial group key to the first group member.

9. The system of claim 5, the group controller server further configured to:
receive leave request from a leaving subset of group members;
determine a new group master key and a new group public parameter;
determine an encrypted private-key update factor based on group members not in the leaving subset of group members; and
multicast the encrypted private-key update factor to the group members.

* * * * *

UNITED STATES PATENT AND TRADEMARK OFFICE
CERTIFICATE OF CORRECTION

| | |
|---|---|
| PATENT NO. | : 8,837,738 B2 |
| APPLICATION NO. | : 13/440111 |
| DATED | : September 16, 2014 |
| INVENTOR(S) | : Dijiang Huang and Zhibin Zhou |

Page 1 of 1

It is certified that error appears in the above-identified patent and that said Letters Patent is hereby corrected as shown below:

IN THE CLAIMS:

Claim No. 4, column 17, line 55:

Remove "key," and replace with -- keys --.

Signed and Sealed this
Twenty-seventh Day of January, 2015

Michelle K. Lee
*Deputy Director of the United States Patent and Trademark Office*